United States Patent Office 3,314,770
Patented Apr. 18, 1967

3,314,770
PROCESS FOR THE PREPARATION OF CHLORODIFLUOROAMINE
William Warren Knipe and Charles Joseph Mackley, Philadelphia, Pa., assignors to Pennsalt Chemicals Corporation, Philadelphia, Pa., a corporation of Pennsylvania
No Drawing. Filed June 14, 1963, Ser. No. 287,757
7 Claims. (Cl. 23—356)

This invention relates to an improved process for the preparation of chlorodifluoroamine by reaction of gaseous chlorine trifluoride with an ammonium fluoride.

In U.S. 3,084,025 there is disclosed the process for making chlorodifluoroamine by reacting an ammonium fluoride such as $NH_4F$ or $NH_4F \cdot HF$ with chlorine trifluoride at a reaction temperature above $-40°$ C. Gaseous chlorine trifluoride reacts smoothly with the ammonium fluoride to yield chlorodifluoroamine in accordance with the following equations:

(a) 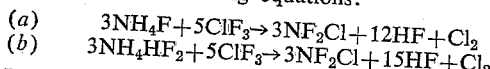
$3NH_4F + 5ClF_3 \rightarrow 3NF_2Cl + 12HF + Cl_2$
(b) $3NH_4HF_2 + 5ClF_3 \rightarrow 3NF_2Cl + 15HF + Cl_2$ In addition to the above reactions, however, there is always present some reaction between the starting reagents to give nitrogen, HF and chlorine in accordance with the following equation:

(c) 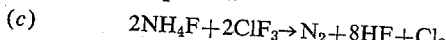
$2NH_4F + 2ClF_3 \rightarrow N_2 + 8HF + Cl_2$

This latter reaction predominates whenever localized overheating of the reactants occurs, and, of course, is undesirable in that it reduces the yield of chlorodifluoroamine product. The process of U.S. 3,084,025 minimizes the undesired reaction according to Equation c by diluting the gaseous chlorine trifluoride with an inert gas such as nitrogen, argon, krypton, helium, etc. It is also essential in the process of the patent that the temperature be held between about $-40°$ C. and about $100°$ C. and there is the further requirement that the concentration of chlorine trifluoride in the gaseous mixture introduced into the reaction zone comprises less than 35% by volume of chlorine trifluoride.

It has now been found in accordance with this invention that the reaction between chlorine trifluoride and an ammonium fluoride may be carried out much more advantageously under less critical control conditions by reacting gaseous chlorine trifluoride with a suspension of the ammonium fluoride in a non-volatile fluorocarbon oil, the reaction occurring at temperatures between about $50°$ and $75°$ C.

In carrying out the process of the invention the equipment used will be inert to the reactants, products and by-products. Useful materials of construction will be those metals resistant to the effects of chlorine and HF (e.g. nickel, Monel, copper, stainless steel, etc.) and also useful are certain thermally stable inert plastics such as the polymers of tetrafluoroethylene, chlorotrifluoroethylene, vinylidene fluoride, copolymers of tetrafluoroethylene and hexafluoropropene, and the like. Other inert materials may also be used, of course, but siliceous materials (e.g. glass, quartz, etc.) are to be avoided because of the attack by HF or chlorine trifluoride that will result.

As indicated, the temperature of the reaction mass will be held between about $50°$ and $75°$ C., although it is preferred that the initial temperature of the suspended ammonium fluoride be between about $60°$ and $73°$ C. At temperatures below about $50°$ C. the reaction does not proceed at any practical rate, whereas above about $75°$ C. exhaustive fluorination of the ammonium fluoride occurs in accordance with Equation c above, which, of course, reduces the yield of product.

Gaseous chlorine trifluoride is introduced into the reactor containing the suspension of ammonium fluoride in the non-volatile fluorocarbon oil, preferably by leading it through a tube extending below the surface of the suspension. The chlorine trifluoride gas may be used without dilution, but may be introduced in admixture with an inert gas (such as nitrogen, helium, etc.) wherein the volume concentration of chlorine trifluoride is between about 3% and 90%, preferably between about 10% and 12%. At a concentration of chlorine trifluoride below about 3%, the localized heating is so small that the reaction requires external heating to bring the temperature to $50°$ to $75°$ C. where reaction proceeds at a practical rate. When undiluted chlorine trifluoride is used, however, much external cooling must be employed to control the temperature. The rate at which the chlorine trifluoride-inert gas mixture is introduced into the reaction is not critical and will be adjusted so that the reaction mass temperature will be easily held between about $50°$ and $75°$ C., at which temperatures the reaction is carried out, as already indicated.

The non-volatile fluorocarbon oil used for the ammonium fluoride suspension will be a low molecular weight polymer of a highly fluorinated hydrocarbon which is liquid at the reaction temperature and which has no significant vapor pressure at about $75°$ C. In general these materials are low molecular weight polymers or telomers of fluoroolefins such as those described in U.S. 3,083,238 and U.S. 2,875,253. It will be understood that these liquids may be obtained from olefins containing a minor proportion of halogen other than fluorine (e.g. trifluorochloroethylene) since if they are not inert to $ClF_3$, the non-fluorine halogen will be partially or completely replaced by fluorine as soon as $ClF_3$ contacts the liquid, thus producing an inert medium. Particularly useful are low molecular weight liquids such as the polychlorotrifluoroethylenes, the telomers from chlorotrifluoroethylene and difluorobromochloromethane, telomers from perfluoroolefins and perfluoroalkyl iodides, and the like.

The process of the invention is illustrated further by the example which follows:

Example 1

A reactor was constructed of 16 mm. O.D. polychlorotrifluoroethylene polymer ("Kel-F") which was compression sealed at both ends with polytetrafluoroethylene ("Teflon") plate 0.25″ thick. A gas inlet was made from a threaded ⅜″ "Kel-F" tube led through a drilled and tapped hole in the top "Teflon" plate and the inlet tube extended below the surface of a suspension of 5 grams of ammonium fluoride ($NH_4F$) in 40 ml. of liquid polychlorotrifluoroethylene distilling above $100°$ C. A gas exit was provided in the equipment by using a 0.25″ copper pipe-to-flare fitting threaded through the "Teflon" cap. Stirring was accomplished by means of a "Teflon" coated magnetic bar. The complete reactor was enclosed in an air bath capable of being maintained within $\pm 1°$ C. at temperatures up to $100°$ C.

A mixture of chlorine trifluoride and nitrogen containing 11.7% by volume of chlorine trifluoride was introduced into the reactor at a gas flow rate of 178 ml. per minute (STP), while the initial suspension temperature was held between $60°$ and $73°$ C. The addition took 2.6 hours and a total of 0.132 mole $ClF_3$ was introduced. $ClF_3$ recovered was 6.29 g. (0.068 mole). The reaction proceeded easily, without difficulty in handling, and the yield of chlorodifluoroamine obtained was very good.

When the reaction was carried out at a temperature below $50°$ C. no chlorodifluoroamine was obtained. On the other hand, when the reaction was carried out slightly above $75°$ C. exhaustive fluorination of the ammonium fluoride occurred with only a poor yield of chlorodifluoroamine being achieved.

Instead of using a mixture of chlorine trifluoride and an inert gas, undiluted chlorine trifluoride may be used as in the above example using external cooling to hold the temperature between about 50° and 75° C. whereby similar results are obtained.

It will be understood that numerous changes and variations may be made from the above description and examples without departing from the spirit and scope of the invention.

We claim:

1. A process for the preparation of chlorodifluoroamine which comprises reacting chlorine trifluoride with a suspension of a solid ammonium fluoride in a low molecular weight, fluorocarbon oil having no significant vapor pressure at approximately 75° C. which is selected from the group consisting of polychlorotrifluoroethylenes, telomers from chlorotrifluoroethylene and difluorobromochloromethane, and telomers from perfluoroolefins and perfluoroalkyl iodides, said chlorine trifluoride being introduced into said oil suspension as a gas admixed with an inert gas diluent, and said reaction being made to occur at a temperature between about 50° and 75° C.

2. The process of claim 1 where the ammonium fluoride is $NH_4F$.

3. The process of claim 1 where the ammonium fluoride is ammonium bifluoride.

4. The process of claim 1 where the diluent is nitrogen.

5. The process of claim 1 where the diluent is helium.

6. The process of claim 1 where the fluorocarbon oil is a polychlorotrifluoroethylene having no significant vapor pressure at approximately 75° C.

7. The process of claim 1 where the ammonium fluoride is $NH_4F$, the fluorocarbon oil is a polychlorotrifluoroethylene having no significant vapor pressure at approximately 75° C, and the inert gas diluent is nitrogen.

References Cited by the Examiner

UNITED STATES PATENTS

| | | | |
|---|---|---|---|
| 2,875,253 | 2/1959 | Barnhart | 260—653 |
| 3,083,238 | 3/1963 | Haupstschein et al. | 260—648 |
| 3,084,025 | 4/1963 | Gardner et al. | 23—14 |

OTHER REFERENCES

Progress Report, Contract NOa(s) 9901, Bureau of Aeronautics, prepared by Metal Hydrides, Inc., printed Oct. 23, 1949, declassified Mar. 15, 1957, p. 4.

OSCAR R. VERTIZ, *Primary Examiner.*

MILTON WEISSMAN, *Examiner.*